United States Patent
Nakahen

(10) Patent No.: US 6,892,474 B2
(45) Date of Patent: May 17, 2005

(54) METHOD FOR CONTROLLING AIR CONDITIONER

(75) Inventor: Nobutaka Nakahen, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 10/734,105

(22) Filed: Dec. 15, 2003

(65) Prior Publication Data

US 2004/0123485 A1 Jul. 1, 2004

(30) Foreign Application Priority Data

Dec. 17, 2002 (JP) ........................ 2002-364782

(51) Int. Cl.$^7$ ................................ F26B 5/04
(52) U.S. Cl. .................... 34/413; 34/423; 34/489; 62/155; 236/78 D
(58) Field of Search .................... 34/395, 396, 413, 34/423, 489; 62/155, 156; 236/78 D

(56) References Cited

U.S. PATENT DOCUMENTS

| | | | |
|---|---|---|---|
| 2,521,081 A | * 9/1950 | Morrison ........................ 34/77 |
| 4,042,016 A | * 8/1977 | Boochever et al. ......... 165/229 |
| 5,146,977 A | * 9/1992 | Kiser .......................... 165/229 |
| 5,269,076 A | * 12/1993 | Breckenridge ................ 34/413 |
| 5,276,980 A | * 1/1994 | Carter et al. .................. 34/191 |
| 5,526,583 A | * 6/1996 | Hull et al. .................... 34/491 |
| 5,605,051 A | * 2/1997 | Iritani et al. .................. 62/160 |
| 6,138,379 A | * 10/2000 | DeVore et al. ................ 34/395 |
| 6,393,723 B1 | * 5/2002 | Nagel .......................... 34/201 |

* cited by examiner

Primary Examiner—Stephen Gravini
(74) Attorney, Agent, or Firm—Manabu Kanesaka

(57) ABSTRACT

In drying the interior of an indoor unit, room humidity (Rh) is detected by a humidity sensor, and a drying operation cycle, in which after first heating operation, which is weak heating operation in which a compressor included in a refrigerating cycle is operated at a low rotational speed, has been performed for a predetermined period of time, second heating operation, which is heating operation close to air blowing operation in which the compressor is stopped, is performed for a predetermined period of time, is repeated a predetermined number of times according to the room humidity (Rh). Thus, the indoor unit's interior can be dried properly without occurrence of dew condensation therein.

5 Claims, 4 Drawing Sheets

OPERATION PROCESSING ACCORDING TO ROOM HUMIDITY Rh

METHOD FOR CONTROLLING AIR CONDITIONER

TECHNICAL FIELD

The present invention relates to a method for controlling an air conditioner. More particularly, it relates to a method for controlling an air conditioner which has an interior drying operation mode for drying the interior of an indoor unit to prevent the development of various bacteria and the emission of unpleasant smell in the indoor unit.

BACKGROUND ART

An air conditioner using a heat pump system has a heating operation mode and a cooling operation mode as the basic operation modes, and at the time of the cooling operation mode and a dehumidifying operation mode (dry operation mode), condensed water adheres to an indoor heat exchanger included in a refrigerating cycle.

Usually, the condensed water is discharged to the outside of a room through a drain pan, but it is not always discharged completely, and sometimes remains in the drain pan after the stoppage of operation.

In this case, dust etc. adhere to the remaining condensed water, by which fungus and other various bacteria develop and propagate, and thereby emitting unpleasant smell. Also, the humidity in the indoor unit is raised by the remaining condensed water, which also emits extraordinarily unpleasant smell.

In such a situation, there has been proposed an air conditioner which performs interior drying operation for drying the interior of indoor unit to prevent the development of various bacteria and the emission of unpleasant smell caused by the remaining condensed water (for example, see Japanese Patent Application Publications No. 9-126528 and No. 10-62000).

The invention described in the Application Publication No. 9-126528 is configured so that when the operation of air conditioner is stopped, air blowing operation or heating operation is performed for a certain period of time (for example, three minutes) to dry the interior of indoor unit, and especially after cooling operation or dehumidifying operation, the interior of indoor unit is dried by prolonging that period of time.

Also, the invention described in the Application Publication No. 10-62000 is configured so that heating operation of air conditioner is started when it is detected that cooling operation has been finished, and during the heating operation, a compressor and an indoor fan are rotated at a low speed, and the operation thereof is performed for a fixed period of time (for example, three minutes).

However, in the aforementioned invention described in the Application Publication No. 9-126528, since the interior of indoor unit is dried mainly by air blowing operation using the indoor fan only, it inevitably takes time to sufficiently dry the interior of indoor unit. For example in a situation of high humidity, it is difficult to sufficiently dry the interior of indoor unit by drying operation for a period of time as short as three minutes.

Also, since the internal situation of indoor unit differs depending on the operation time of cooling operation or dehumidifying operation, even if heating operation is additionally performed, when the heating operation time is fixed, the operation time for drying the interior of indoor unit becomes longer than necessary, or contrarily the operation for drying the interior of indoor unit becomes insufficient, which poses a problem in that proper drying operation is not performed.

In particular, the drying operation performed longer than necessary is unfavorable from the viewpoint of energy saving, and contrarily the insufficient drying operation leads to the development of various bacteria and the emission of unpleasant smell.

In the aforementioned invention described in the Application Publication No. 10-62000, since heating operation is started immediately after cooling operation, humidified air with a relative humidity of approximately 100% is blown from the indoor unit, which sometimes gives unwell feeling to the user. Also, the humidified air may produce dew condensation in the indoor unit. Moreover, since the heating operation time is fixed, there arises the same problem as that with the invention described in the Application Publication No. 9-126528.

SUMMARY OF THE INVENTION

The present invention has been made to solve the above problems, and accordingly an object thereof is to provide a method for controlling an air conditioner, in which drying operation for the interior of indoor unit is performed properly according to the humidity in a room.

To achieve the above object, the present invention provides a method for controlling an air conditioner comprising an indoor unit having an indoor fan and a heat exchanger that is involved in a refrigerating cycle, the indoor fan and the heat exchanger arranged in an air passage connecting an air inlet port and an air outlet port, the method comprising heat-exchanging air sucked through the air inlet port and blowing it through the air outlet port to control a room temperature, wherein the method has an interior drying operation mode for drying the interior of the indoor unit, and the method comprises: at the time of the interior drying operation mode, detecting room humidity (Rh) by a humidity sensor provided in the indoor unit; and repeating a drying operation cycle a predetermined number of times according to the room humidity (Rh), the drying operation cycle including: performing for a predetermined period of time, first heating operation which is weak heating operation with a compressor involved in the refrigerating cycle being operated at a low rotational speed; and then performing for a predetermined period of time, second heating operation which is heating operation close to air blowing operation in which the compressor is stopped, whereby the interior of the indoor unit is dried.

The present invention also embraces a mode in which by changing the sequential order of the drying operation cycle, the first heating operation is performed for a predetermined period of time after the second heating operation has been performed for a predetermined period of time.

In the present invention, the user can appropriately select the interior drying operation mode by operating a remote controller. At this time, specifically, when the interior drying operation mode is designated by a remote controller, a drying operation cycle is repeated a predetermined number of times according to the room humidity (Rh), the drying operation cycle including: performing the second heating operation for a predetermined period of time; and then, continuing the second heating operation for a predetermined period of time if the operation state before the start of interior drying operation is heating operation or air blowing operation, or performing the first heating operation for a predetermined period of time and subsequently performing the second heating operation for a predetermined period of time if the operation state before the start of interior drying operation is operation other than heating operation and air blowing operation, whereby the interior of the indoor unit is dried.

The present invention embraces a mode in which at least when the second heating operation is performed, a vertical wind deflector provided in the air outlet port is directed in the horizontal direction. According to this mode, even if the blown-out air is approximately 100% humidified, because the second heating operation is heating operation close to air blowing operation, dew condensation in the indoor unit is prevented effectively, and hence the degradation of room environment is restrained.

Also, in the present invention, it is preferable that the number of repetitions of the drying operation cycle be set at a higher value as the room humidity (Rh) increases; when the second heating operation is performed, the number of transmissions of a heating 0 code to the compressor be counted; and the drying operation cycle be repeated until the count value reaches a predetermined preset value. According to this configuration, when the room humidity (Rh) is high, interior drying operation is prolonged, and contrarily when the room humidity (Rh) is low, interior drying operation is shortened. Therefore, the interior of indoor unit is dried efficiently and properly, so that energy saving is achieved.

DETAILED DESCRIPTION

A preferred embodiment of the present invention will now be described with reference to FIGS. 1 to 4. The present invention is not limited to this embodiment.

Figure 1:
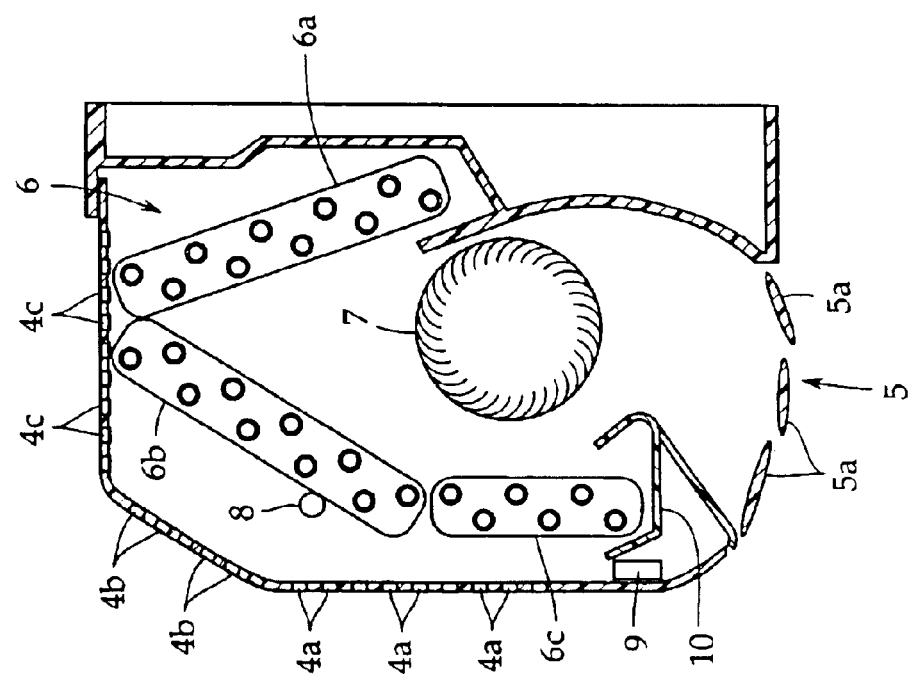
FIG. 1 is a sectional view schematically showing the construction of an indoor unit included in an air conditioner that is controlled by a method in accordance with the present invention.
Figure 2:
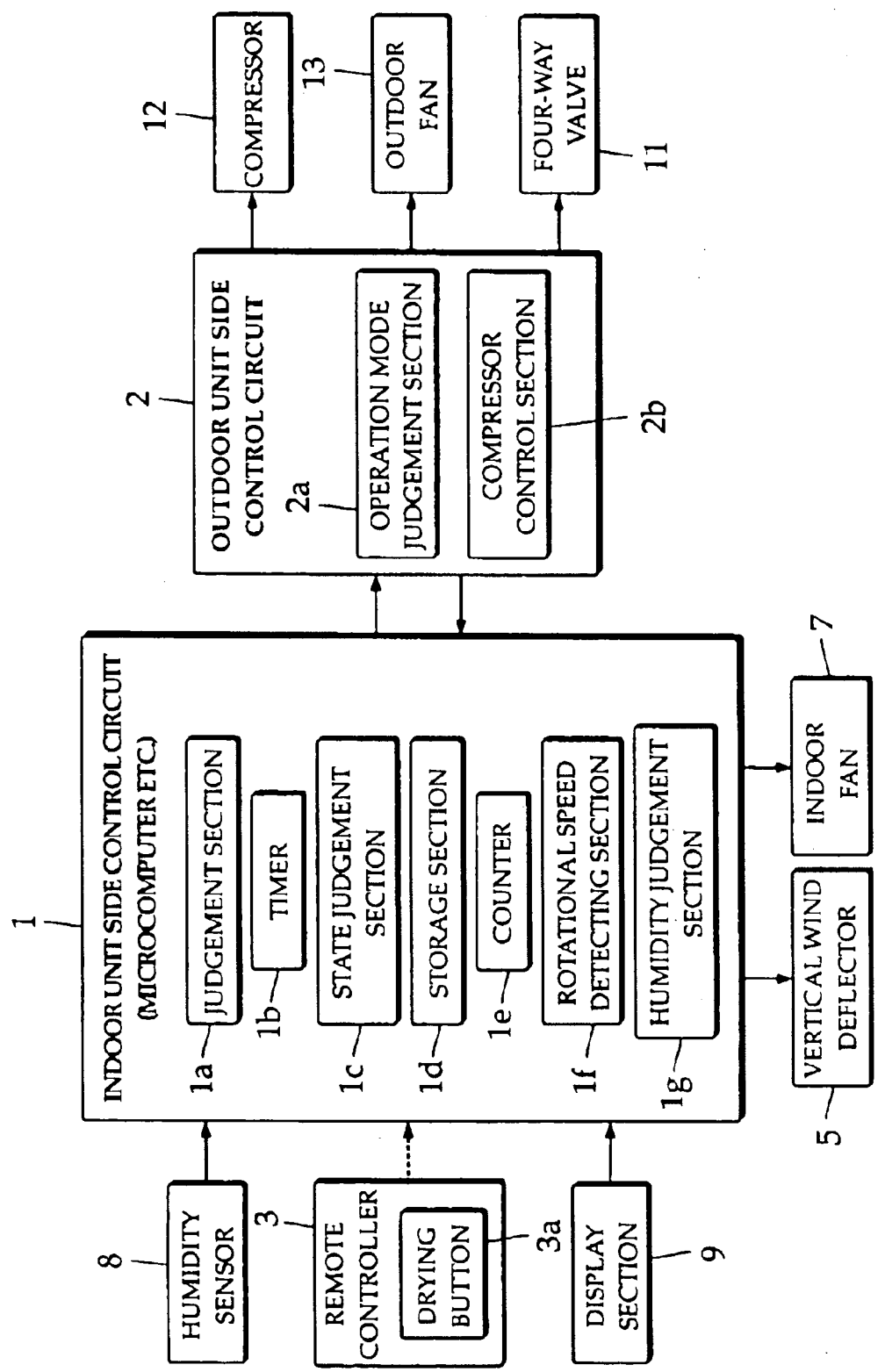
FIG. 2 is a schematic block diagram showing a control system for the aforementioned air conditioner.

First, referring to FIGS. 1 and 2, this air conditioner has an indoor unit side control circuit 1 and an outdoor unit side control circuit 2, and carries out control necessary for room temperature control.

Upon receipt of a signal for drying operation for indoor unit interior from a remote controller 3 operated by the user, drying operation for indoor unit interior is performed. At this time, proper interior drying operation is performed by switching over the content of interior drying operation according to the operation state before signal reception and the room humidity (Rh).

In this embodiment, an indoor unit is of a wall mounted type, and is formed with air inlet ports 4a, 4b and 4c in the range from the front surface to the top surface of a housing thereof. Also, an air outlet port 5 is provided on the bottom surface of the housing, and a vertical wind deflectors 5a and transverse wind deflectors (not shown) are arranged to change the air blowing-out direction.

In an air passage connecting the air inlet ports 4a, 4b and 4c and the air outlet port 5, an indoor heat exchanger 6 and an indoor fan 7 are arranged.

In this embodiment, the indoor heat exchanger 6 includes three exchangers 6a, 6b and 6c, and these heat exchangers 6a, 6b and 6c are arranged in a Λ shape so as to cover the indoor fan 7.

The air inlet port 4b arranged at a corner between the front surface and the top surface of indoor unit housing is normally open, and the heat exchanger 6b facing the air inlet port 4b is provided with a humidity sensor 8 for detecting the room humidity (Rh).

On the front side of the indoor unit housing, a receiving section for receiving a remote control signal from the remote controller 3 is included, and a display section 9 for displaying the operation state is provided. In the indoor unit, a drain pan 10 is provided to receive condensed water dripping from the indoor heat exchanger 6 and discharge it out of door.

As shown in FIG. 2, the remote controller 3 is provided with a special-purpose drying button 3a for setting the interior drying operation. An outdoor unit is provided with a four-way valve 11, a compressor 12, and outdoor heat exchanger (not shown), which are included in a refrigerating cycle together with the aforementioned heat exchangers 6a, 6b and 6c, and an outdoor fan 13 therefor.

The indoor unit side control circuit 1 not only controls the tilt of the vertical wind deflectors 5a and the transverse wind deflectors (not shown) and the rotational speed of the indoor fan 7 according to an operation signal from the remote controller 3, but also sends a control signal including an operation code of the compressor 12 according to the current room temperature and the preset temperature to the outdoor unit side control circuit 2. Upon receipt of the control signal, the outdoor unit side control circuit 2 controls the four-way valve 11 and the compressor 12.

Figure 3:
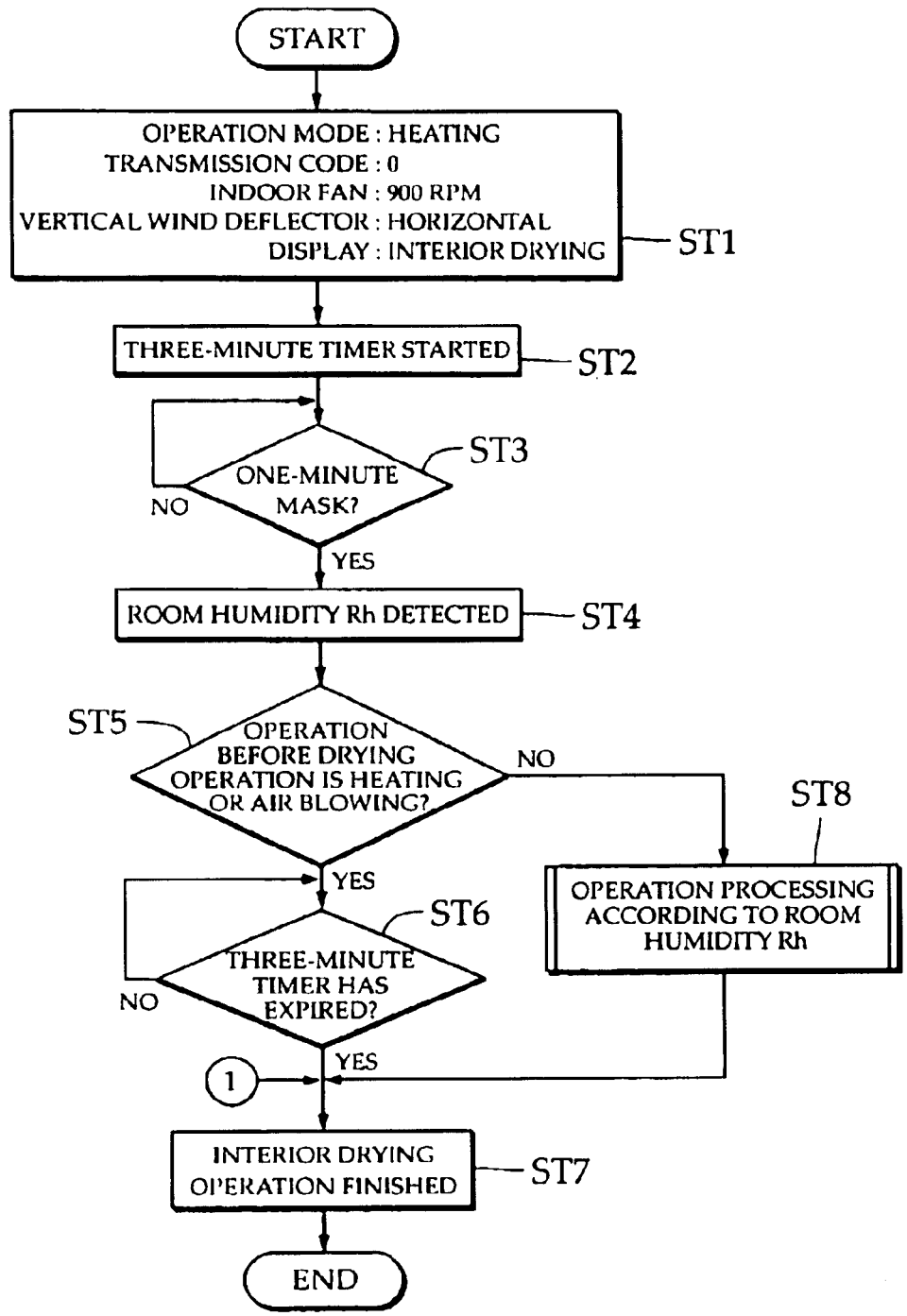
FIGS. 3 and 4 are flowcharts for explaining the operation of the present invention.

To carry out the above-described control, the indoor unit side control circuit 1 includes a judgment section 1a for reading the operation signal from the remote controller 3 and judging its content, a state judgment section 1c for judging the operation state of the air conditioner, a timer 1b used at the time of execution of a routine shown in FIG. 3, a storage section 1d, a counter 1e, a rotational speed detecting section 1f for detecting the rotational speed of the indoor fan 7, and a humidity judgment section 1g for judging the room humidity (Rh) based on a detection signal from the humidity sensor 8.

The outdoor unit side control circuit 2 includes an operation mode judgment section 2a for judging an operation mode included in a control signal from the indoor unit side control circuit 1 and a compressor control section 2b to control the four-way valve 11, the compressor 12, and the outdoor fan 13.

Next, one example of the control operation of air conditioner in accordance with the present invention will be described with reference to flowcharts shown in FIGS. 3 and 4.

First, as the basic operation, the indoor side and outdoor side control circuits 1 and 2 perform, for example, cooling operation or heating operation as general control necessary for room temperature control according to the operation signal from the remote controller 3.

Figure 4:
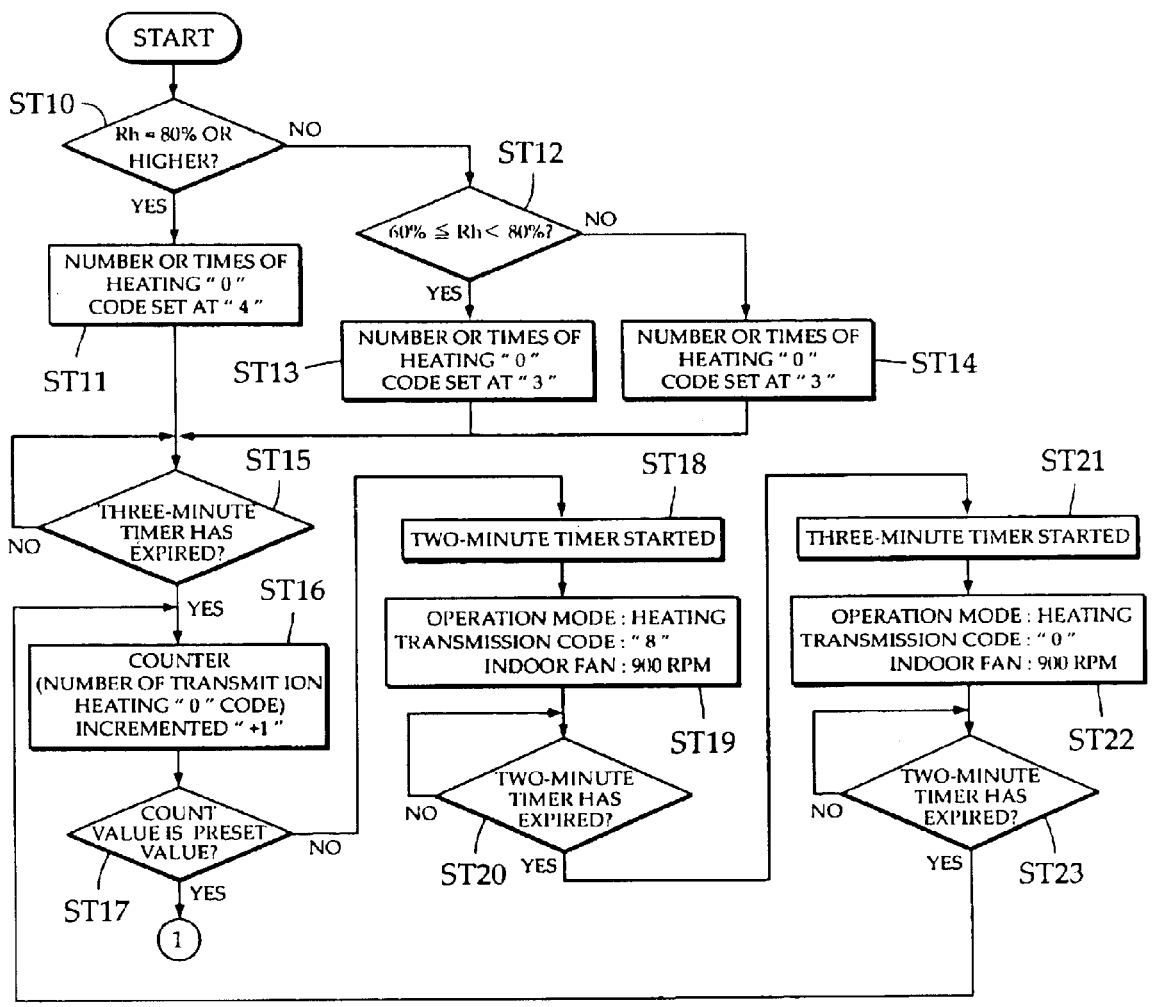

If an interior drying operation signal is sent from the remote controller 3 when the above-described general operation is performed, or the operation is stopped, the indoor unit side control circuit 1 executes a routine shown in FIGS. 3 and 4.

When this routine starts, the indoor unit side control circuit 1 first stores the operation state just before the start of interior drying operation in the storage section 1d.

Then, the four-way valve 11 is switched to the heating cycle side via the outdoor unit side control circuit 2, and a signal of operation code 0 (rotational speed 0 rps) of the compressor 12 is sent and the rotational speed of the indoor fan 7 is set at a low value, for example, 900 rpm, by which heating operation close to air blowing operation is performed. Also, the vertical wind deflectors 5a are set in the horizontal direction, and interior drying operation is displayed on the display section 9 (Step ST1).

In the present invention, the heating operation state close to air blowing operation, in which the compressor 12 is stopped, is called "second heating operation".

Succeedingly, a three-minute timer of the timer 1b is started (Step ST2), masking is performed for one minute (Step ST3), and the room humidity (Rh) is detected by the detection signal from the humidity sensor 8 (Step ST4).

Next, it is judged from the content of the storage section 1d whether or not the operation state before the start of interior drying operation is heating operation or air blowing operation (Step ST5).

If the judgment result is YES and the operation state before the start of interior drying operation is heating operation or air blowing operation, the control proceeds from Step ST5 to Step ST6, where it is judged whether or not the three-minute timer has expired. When the timer expires, the interior drying operation is finished, and the operation state is returned to the state before the start of interior drying operation, by which the routine is ended (Step ST7).

Thus, when the operation state before the start of interior drying operation is heating operation or air blowing operation, the second heating operation is kept for three minutes to perform the drying operation for indoor unit interior.

Specifically, when the operation state before the start of interior drying operation is heating operation or air blowing operation, the indoor unit interior has already been dried to some extent, and if the second heating operation is performed, the indoor unit interior is dried sufficiently.

Also, at the time of the second heating operation, since the indoor fan blows weak wind, the room environment is not degraded. Although the operation time of the second heating operation is set at three minutes in this example, the operation time may be determined arbitrarily depending on whether the installation district of the air conditioner is a relatively cold district or a relatively warm district.

On the other hand, if the operation state before the start of interior drying operation is operation other than heating operation and air blowing operation, that is, cooling operation or dehumidifying operation (including operation stoppage), the control proceeds from Step ST5 to Step ST8, where interior drying operation according to the room humidity (Rh) is executed by following the flowchart shown in FIG. 4.

In this case, it is judged whether or not the detected room humidity (Rh) is 80% or higher (Step ST10). If the room humidity (Rh) is 80% or higher, the number of times of heating code 0 transmission is set at 4 in Step ST11. If the room humidity (Rh) is lower than 80% and not lower than 60%, the control proceeds from Step ST12 to Step ST13, where the number of times of heating code 0 transmission is set at 3. If the room humidity (Rh) is lower than 60%, the control proceeds from Step ST12 to Step ST14, where the number of times of heating code 0 transmission is set at 2.

The rotational speed command of compressor is sent from the indoor unit side control circuit 1 to the outdoor unit side control circuit 2 with a transmission code. For the transmission code, the rotational speed (rps) of compressor is represented by a numerical value from 0 to 30, and a frequency code corresponding to the transmission code is prepared in the outdoor unit side control circuit 2. The outdoor unit side control circuit 2 converts the transmission code to the frequency code, and thereby operates the compressor. The aforementioned heating 0 code is a transmission code in which the rotational speed of compressor is 0 rps in a state in which the refrigerating cycle is in a heating operation mode.

Succeedingly, it is judged whether or not the three-minute timer started in the aforementioned step ST2 has expired (Step ST15). If the timer has expired, the control proceeds from Step ST15 to Step ST16, where a heating 0 code transmission counter included in the counter 1e is incremented (+1 is added to the count value). In this case, because of first heating 0 code transmission, the heating 0 code transmission counter is 1.

Succeedingly, it is judged whether or not the value of heating 0 code transmission counter is the value set in the aforementioned step ST11, ST13, or ST14 (Step ST17).

Specifically, when the room humidity (Rh) is 80% or higher, it is judged whether or not the value of heating 0 code transmission counter is 4. When the room humidity (Rh) is not lower than 60% and lower than 80%, it is judged whether or not the value of heating 0 code transmission counter is 3. When the room humidity (Rh) is lower than 60%, it is judged whether or not the value of heating 0 code transmission counter is 2.

In the Step ST17, if the value of heating 0 code transmission counter is not the set value, a two-minute timer of the timer 1b is started (Step ST18), and while the operation mode is kept in the heating operation mode, the operation code of the compressor 12 is set at 8 (rotational speed of 39 rps), and the rotational speed of the indoor fan 7 is set at 900 rpm (Step ST19).

Specifically, weak heating operation in which the compressor is operated at a low rotational speed is performed. In the present invention, this heating operation state is called "first heating operation".

Then, it is judged whether or not the two-minute timer has expired (Step ST20). If the two-minute timer has expired, that is, if the first heating operation has been performed for two minutes, the three-minute timer is started (Step ST21), and thereafter, while the operation mode is kept in the heating operation mode, the operation code of the compressor 12 is set at 0 (stoppage), and the rotational speed of the indoor fan 7 is set at 900 rpm, by which the second heating operation is performed (Step ST22).

If the three-minute timer has expired, that is, if the second heating operation close to air blowing operation has been performed for three minutes while the compressor 12 has the 0 code, the control returns from Step ST23 to Step ST16, by which the above-described processing is repeated.

Specifically, when the room humidity (Rh) is 80% or higher, after the first heating operation has been performed for two minutes, a drying operation cycle in which the second heating operation is performed for three minutes is repeated three times. When the room humidity (Rh) is not lower than 60% and lower than 80%, the drying operation cycle is repeated two times. When the room humidity (Rh) is lower than 60%, the drying operation cycle is executed once. The setting time of the two-minute timer and three-minute timer is one example.

After the drying operation cycle has been executed a predetermined number of times, the control proceeds from Step ST17 to Step ST7 in FIG. 3, by which the interior drying operation is finished.

Thus, as the room humidity (Rh) increases, the number of repetitions of the drying operation cycle in which the first heating operation (weak heating operation) and the second heating operation (heating operation close to air blowing operation) are combined is increased. If the room humidity (Rh) is low, the number of repetitions of the drying operation cycle is decreased. If the room humidity (Rh) is further low, the number of repetitions of the drying operation cycle is further decreased. Thereby, the indoor unit interior can be dried properly according to the room humidity (Rh). For example, even if condensed water accumulates in the drain pan 10, the indoor unit interior can be dried by evaporating the condensed water.

Also, if the special-purpose drying button 3a on the remote controller 3 is operated, the interior drying operation in accordance with the present invention can be performed, so that even if the air conditioner is in any operation state, the interior drying operation can be performed appropriately as the user wishes.

Furthermore, in the case where the operation before the start of interior drying operation is cooling operation or dehumidifying (dry) operation, the room humidity (Rh) is relatively high, and moreover the indoor unit interior is made in a cooled state by that operation.

If the heating operation is started to dry the indoor unit interior in this state as in the prior art (the invention described in the Application Publication No. 10-62000), dew condensation is liable to occur in the interior of indoor unit. However, the drying operation in the present invention is drying operation in which the first heating operation and the second heating operation are combined, and the vertical wind deflectors 5a are directed in the horizontal direction as shown in FIG. 1 to increase the amount of circulated air in the indoor unit. Therefore, dew condensation does not occur in the indoor unit, and the indoor unit interior can be dried effectively.

Although the above-described embodiment is configured so that the interior drying operation is performed when the special-purpose drying button 3a of the remote controller 3 is operated, the control method can be programmed so that the interior drying operation in accordance with the present invention is performed automatically, for example, after cooling operation or dehumidifying (dry) operation has been performed.

Also, a control method in which in the drying operation cycle using the first heating operation and the second heating operation, the first heating operation is performed after the second heating operation has been performed is also embraced in the present invention.

What is claimed is:

1. A method for controlling an air conditioner comprising an indoor unit having an indoor fan and a heat exchanger that is involved in a refrigerating cycle, said indoor fan and said heat exchanger arranged in an air passage connecting an air inlet port and an air outlet port, said method comprising heat-exchanging air sucked through said air inlet port and blowing it through said air outlet port to control a room temperature, wherein said method has an interior drying operation mode for drying the interior of said indoor unit, and said method comprises: at the time of said interior drying operation mode, detecting room humidity (Rh) by a humidity sensor provided in said indoor unit; and repeating a drying operation cycle a predetermined number of times according to said room humidity (Rh), said drying operation cycle including: performing for a predetermined period of time, first heating operation which is weak heating operation with a compressor involved in said refrigerating cycle being operated at a low rotational speed; and then performing for a predetermined period of time, second heating operation which is heating operation close to air blowing operation in which said compressor is stopped, whereby the interior of said indoor unit is dried.

2. The method for controlling an air conditioner according to claim 1, wherein by changing the sequential order of said drying operation cycle, said first heating operation is performed for a predetermined period of time after said second heating operation has been performed for a predetermined period of time.

3. The method for controlling an air conditioner according to claim 1, wherein when said interior drying operation mode is designated by a remote controller, a drying operation cycle is repeated a predetermined number of times according to said room humidity (Rh), said drying operation cycle including: performing said second heating operation for a predetermined period of time; and then, continuing said second heating operation for a predetermined period of time if the operation state before the start of interior drying operation is heating operation or air blowing operation, or performing said first heating operation for a predetermined period of time and subsequently performing said second heating operation for a predetermined period of time if the operation state before the start of interior drying operation is operation other than heating operation and air blowing operation, whereby the interior of said indoor unit is dried.

4. The method for controlling an air conditioner according to claim 1, wherein a vertical wind deflector for changing the blowing-out direction is provided in said air outlet port, and at least when said second heating operation is performed, said vertical wind deflector is directed in the horizontal direction.

5. The method for controlling an air conditioner according to claim 1, wherein the number of repetitions of said drying operation cycle is set at a higher value as said room humidity (Rh) increases; when said second heating operation is performed, the number of transmissions of a heating 0 code to said compressor is counted; and said drying operation cycle is repeated until the count value reaches a predetermined preset value.

* * * * *